(12) United States Patent
Won

(10) Patent No.: US 7,742,107 B2
(45) Date of Patent: Jun. 22, 2010

(54) DISPLAY APPARATUS AND METHOD FOR CONTROLLING THE SAME

(75) Inventor: Kang-young Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 11/482,710

(22) Filed: Jul. 10, 2006

(65) Prior Publication Data

US 2007/0019111 A1 Jan. 25, 2007

(30) Foreign Application Priority Data

Jul. 25, 2005 (KR) ...................... 10-2005-0067553

(51) Int. Cl.
*H04N 5/50* (2006.01)
*H04N 5/45* (2006.01)

(52) U.S. Cl. ...................................... 348/569; 348/565

(58) Field of Classification Search ................ 348/569, 348/563–566, 568, 584, 586, 588, 589, 598–600; 345/629, 634–636; *H04N 5/50, 5/445, 5/45, H04N 9/74, 9/76*
See application file for complete search history.

(56) References Cited

U.S. PATENT DOCUMENTS 6,690,427 B2 2/2004 Swan
7,006,156 B2 * 2/2006 Hirase et al. ................ 348/565
7,250,982 B2 * 7/2007 Cho ........................... 348/565
2004/0218098 A1 * 11/2004 Lee et al. .................... 348/565

FOREIGN PATENT DOCUMENTS

| JP | 2001-016601 | 1/2001 |
|---|---|---|
| JP | 2004-317733 | 11/2004 |
| KR | 1997-20130 | 5/1997 |
| KR | 1997-0057148 | 7/1997 |
| KR | 10-2002-0001361 | 1/2002 |
| KR | 10-2002-0082563 | 10/2002 |
| KR | 10-2004-0025407 | 3/2004 |

* cited by examiner

*Primary Examiner*—Sherrie Hsia
(74) *Attorney, Agent, or Firm*—Roylance, Abrams, Berdo & Goodman, L.L.P.

(57) ABSTRACT

A display apparatus comprises a display unit; a first processor for outputting a first signal including an on-screen-display (OSD) menu signal and a first image signal. A second processor has a picture-in-picture (PIP) function, the second processor processes one of a second image signal and the first signal and outputs the processed signal to the display unit. A control unit controls the first processor for interrupting an output of the first image signal and outputting the OSD menu signal and for controlling the second processor for PIP-processing to output the OSD menu signal as a main screen and the second image signal as a sub-screen in the case that a prescribed OSD menu function is selected when the display unit displays an image according to the second image signal. Thus, a display apparatus and a method for controlling the same are provided which can display a harmonized OSD menu screen without an additional cost.

15 Claims, 3 Drawing Sheets

DISPLAY APPARATUS AND METHOD FOR CONTROLLING THE SAME

CROSS-REFERENCE TO RELATED APPLICATIONS

This application claims from the benefit under 35 U.S.C. §119(a) of Korean Patent Application No. 2005-0067553, filed on Jul. 25, 2005, in the Korean Intellectual Property Office, the entire disclosure of which is hereby incorporated by reference.

BACKGROUND OF INVENTION

1. Field of Invention

The present invention relates to a display apparatus. More particularly, the present invention relates to a display apparatus and a method for controlling the same which improves a process for generating an on-screen-display (OSD) menu.

2. Description of the Related Art

In general, as a typical display apparatus, the television receives broadcast signals through an antenna or receives image signal from a TV card and displays the received image signals. Recently, televisions which can receive and display image signals from various external signal generation sources such as video tape recorders (VTR), video camcorders, set top boxes (STB) and the like have become popular. Furthermore, televisions which can be used as a computer monitor displaying a PC image signal having a high resolution and received from a computer main body have become available. In televisions that can display image signal received from various external signal generation sources, one or more processors are required for processing various kinds of image signals received from various external signal generation sources in view of a resolution of the image signal.

A conventional television for displaying an image signal received from various external signal generation sources is illustrated with reference to FIG. 1 below. As shown in FIG. 1, the television comprises a signal processing unit 10, a second scaler 20 and a display unit 22.

According to recent trends, the signal processing unit 10 comprises an image decoder 2, a first scaler 4, an on-screen-display (OSD) generation unit 6 and a mixer 8 which are preferably fabricated on a single chip. An image signal received from an external source is processed in the image decoder 2 and the first scaler 4, the processed image signal is outputted to the second scaler 20.

In general, image signals can be broadcast signals, image signals received from a video player or the digital video disk (DVD) player, and they can be standard definition (SD) image signals or high definition (HD) image signals. Such image signals are analog-to-digital (A/D) converted or decoded into an image signal suitable for display on the display unit.

The second scaler 20 processes image signals having a high resolution which can not be processed in the signal processing unit 10. The second scaler 20 receives and processes the typical high resolution PC image signal and outputs the processed signal to the display unit 22. Also, the second scaler 20 can simply pass the image signal outputted from the signal processing unit 10 to output the image signal to the display unit 22. In addition, the second scaler 20 can perform an additional process (for example, panorama, letterbox, and so on) to process the image signal with a final format to be displayed.

Accordingly, in the conventional television, once a standard resolution image display of the image signal is selected according to the user's selection, the image signal is passed in the signal processing unit 10 and the second scaler 20, and then displayed on the display unit 22. If the display of high resolution PC image signals is selected, the image signal is passed in the second scaler 20 and then displayed on the display unit 22.

Here, once a signal for the generation of an on screen display (OSD) menu is received in the process of processing the image signal inputted to the signal processing unit 10 in order to display an image of the image signal having the standard resolution, the OSD generation unit 6 generates and outputs the OSD menu signal. Accordingly, the mixer 8 outputs a prescribed image signal obtained by synthesizing the image signal outputted from the first scaler 4 and the OSD menu signal outputted from the OSD generation unit 6 to the second scaler 20, this image signal is passed in the second scaler 20 and then displayed on the display unit 22 as the image including the OSD menu.

In general, however, the second scaler 20 of the conventional television as described above does not include a function for synthesizing two image signals like the mixer 8. Therefore, conventional televisions have a problem in that once the signal for generation of the OSD menu is received in the process of processing the PC image signal inputted to the second scaler 20 in order to display a high resolution PC image signal, although the OSD generation unit 6 in the signal processing unit 10 generates and outputs the OSD menu signal, the second scaler 20 does not synthesize the OSD menu signal and the PC image signal, and so the OSD menu is not displayed on the display unit 22 along with the PC image signal.

In order to solve the above mentioned problem, a structure in which an independent chip (not shown) is additionally provided in addition to the OSD generation unit 6 can be used. However, this is not an optimal solution since it requires additional cost to add an additional chip, and also because there is no unity of the menu screens due to a difference between the OSD menu screens obtained when the image with the standard resolution and the image with the high resolution are displayed. An appearance difference is generated by a variation of resolution and definition of image according to a performance of the processor.

SUMMARY OF THE INVENTION

Accordingly, it is an aspect of embodiments of the present invention to provide a display apparatus and a method for controlling the same which can display a harmonized OSD menu screen without an additional cost.

The foregoing and/or other aspects of embodiments of the present invention can be achieved by providing a display apparatus comprising a display unit and a first processor for outputting a first signal including an on-screen-display (OSD) menu signal and a first image signal. A second processor has a picture-in-picture (PIP) function. The second processor processes one of a second image signal and the first signal and outputs the processed signal to the display unit. A control unit controls the first processor to interrupt an output of the first image signal and output the OSD menu signal and controls the second processor for PIP processing to output the OSD menu signal as a main screen and the second image signal as a sub screen in the case that a prescribed OSD menu function is selected when the display unit displays an image according to the second image signal.

According to an aspect of the present invention, the second processor is a scaler having the PIP function. The second processor receives the second image signal and the first signal and processes one of the second image signal and the first signal with a format to be displayed on the display unit.

According to an aspect of the present invention, the first image signal is one of a composite video baseband signal (CVBS) which is an image signal having the standard resolution, a broadcast signal and an S video signal, and the second image signal is a PC signal which is a high resolution image signal that is not processed in the first processor.

According to an aspect of the present invention, the first processor comprises an image processing unit for processing the first image signal received from an external source, an OSD generation unit for generating the OSD menu signal and a mixer for synthesizing the first image signal processed in the image processing unit and the OSD menu signal generated in the OSD generation unit to output the synthesized signal.

According to an aspect of the present invention, the control unit controls the OSD generation unit to disable the image processing unit and to output the OSD menu signal and control the second processor for PIP processing the OSD menu signal output through the mixer into the sub screen and the second image signal into main screen if a prescribed OSD menu function is selected when the image is displayed on the display unit according to the second image signal.

According to an aspect of the present invention, the display apparatus further comprises a user input unit for selecting the OSD menu function and adjusting the OSD menu function. The control unit controls the second processor to display the image on the display unit according to the second-image signal when displaying the image according to the second image signal is selected through the user input unit, and controls the OSD generation unit for disabling the image processing unit and outputting the OSD menu signal when the OSD menu function is selected through the user input unit.

According to an aspect of the present invention, the control unit controls the image processing unit and the second processor to display the image on the display unit according to the first image signal when displaying the image according to the first image signal is selected through the user input unit and controls the OSD generation unit to output the OSD menu signal when the OSD menu function is selected through the user input unit.

According to an aspect of the present invention, the control unit outputs a signal regarding the kind of the OSD menu screen selected according to an adjustment to the second processor when the OSD menu function is adjusted through the user input unit.

According to an aspect of the present invention, the second processor stores information on a display location and a display dimension corresponding to the kind of the OSD menu screen in advance, and adjusts and PIP-processes the display location and the display dimension of the OSD menu screen according to the OSD menu signal received from the first processor in response to the signal regarding the kind of the OSD menu screen provided from the control unit.

According to an aspect of the present invention, the second processor comprises an image port to which the first signal is inputted and an input port to which the second image signal is inputted.

The foregoing and/or other aspects of the present invention can be achieved by providing a method for controlling a display apparatus comprising a display unit, a first processor for outputting a first signal including an on-screen-display (OSD) menu signal and a first image signal and a second processor having a picture-in-picture (PIP) function, processing one of a second image signal and the first signal and outputting the processed signal to the display unit. The method comprises displaying an image on the display unit according to the second image signal if displaying the image according to the second image signal is selected; deciding whether a prescribed OSD menu function is selected when the image is displayed according to the second image signal; interrupting an output of the first image signal and outputting the OSD menu signal by controlling the first processor if the OSD menu function is selected; and PIP-processing and outputting the outputted OSD menu signal and the second image signal into a sub screen and a main screen, respectively through the second processor.

According to an aspect of the present invention, the second processor comprises a scaler having the PIP function. The second processor receives the second image signal and the first signal, and the scaler processes one of the second image signal and the first signal with a format to be displayed on the display unit.

According to an aspect of the present invention, the first image signal is one of a composite video baseband signal (CVBS) which is a standard resolution image signal, a broadcast signal and an S video signal, and the second image signal is a PC signal which is a high resolution image signal that is not processed in the first processor.

According to an aspect of the present invention, the first processor comprises an image processing unit for processing the first image signal received from an external source, an OSD generation unit for generating the OSD menu signal and a mixer for synthesizing the first image signal processed in the image processing unit and the OSD menu signal generated in the OSD generation unit to output the synthesized signal. The method further comprises disabling the image processing unit to interrupt an output of the first image signal, and controlling the OSD generation unit to output the OSD menu signal, if the OSD menu function is selected.

According to an aspect of the present invention, the method for controlling the display apparatus further comprises storing information on a display location and a display dimension corresponding to the kind of the OSD menu screen in the second processor in advance, and wherein in the PIP-processing and outputting step, the second processor adjusts and PIP-processes the display location and the display dimension of the OSD menu signal according to the kind of the OSD menu screen in response to the OSD menu signal outputted from the first processor.

BRIEF DESCRIPTION OF THE DRAWINGS

The above and/or other aspects and advantages of exemplary embodiments of the prevent invention will be more readily appreciated from the following detailed description taken in conjunction with the accompany drawings, in which.

Throughout the drawings, like reference numbers should be understood to refer to like elements, features and structures.

DETAILED DESCRIPTION OF EXEMPLARY EMBODIMENTS

Figure 2:
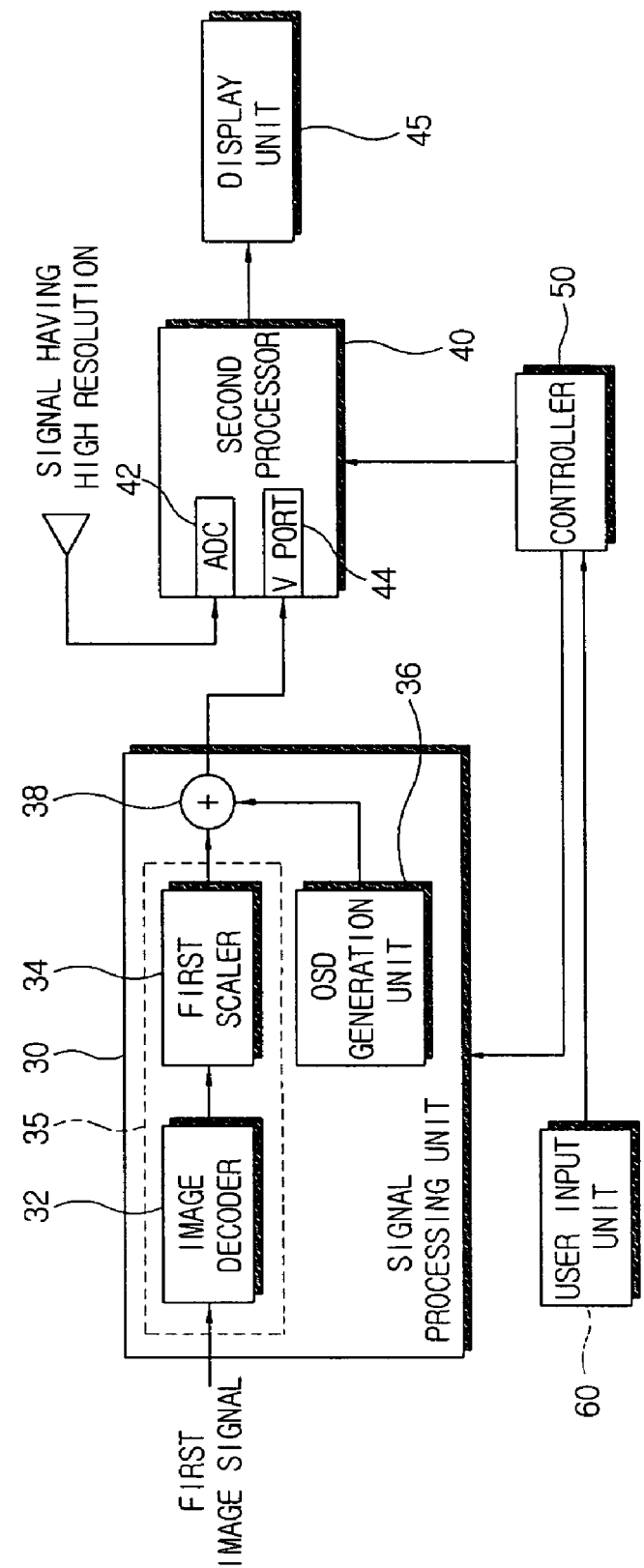
FIG. 2 is a control block diagram of a display apparatus according to an exemplary embodiment of the present invention.

Reference will now be made in detail to exemplary embodiments of the present invention, which are illustrated in the accompanying drawings FIG. 2 is a control block diagram illustrating an exemplary embodiment of the present invention. As shown in FIG. 2, the display apparatus comprises a first processor 30 for processing a first image signal having a standard resolution, a second processor 40 for processing a second image signal having a high resolution, a display unit 45, a controller 50 and a user input unit 60.

The display unit 45 receives the image signal from the second processor 40 to display the image. The display unit 45 may comprise a display panel (not shown) on which the image is displayed and a panel driving unit (not shown) for processing the signal received from the second processor 40 to make the image displayed on the display panel (not shown).

The user input unit 60 outputs a key signal to the controller 50 according to an operation of the user. The user input unit 60 comprises various function adjusting keys (not shown) for adjusting an operation of the display apparatus. Also, the user input unit 60 preferably comprises a signal source selection key (not shown) for selecting the image signal to be displayed, an On Screen Display (hereinafter refer to as "OSD") menu key (not Shown) for selecting a function of the OSD menu, a four directional (up/down/left/right) key and an EXIT key (not shown) for navigating and adjusting a function of the OSD menu. The user input unit 60 may comprise a key signal generation unit (not shown) for generating a key signal in response to an operation of the key.

To meet a trend of recent image processing systems, the first processor 30 comprises an image processing unit 35 for processing the first image signal received from an external source, an OSD generation section 36 for generating the OSD menu signal and a mixer 38 for synthesizing the first image signal outputted from the image processing unit 35 and the OSD menu signal outputted from the OSD generation unit 36 and outputting the synthesized signal to the second processor 44. The above components of the first processor 30 are preferably fabricated in one chip, although any suitable arrangement should be considered within the scope of the present invention.

The image processing unit 35 comprises an image decoder 32 for processing the image of the first image signal and displaying the image on the display unit 45 according to a control of the controller 50 and a first scaler 34. At this time, the first image which is processed through the image decoder 32 and the first scaler 34 of the image processing unit 35 is outputted to the mixer 38.

According to a control of the controller 50, the OSD generation unit 36 generates the OSD menu signal corresponding to a control and outputs into mixer 38. The mixer 38 generates a prescribed first signal obtained by synthesizing the first image signal outputted from the image processing unit 35 and the OSD menu signal outputted from the OSD generation unit 36 and outputs the first signal to the second processor 40. At this time, in the case that one of the first image signal outputted from the image processing unit 35 and the OSD menu signal outputted from the OSD generation unit 36 is inputted, it is possible to make the mixer 38 pass only the inputted signal and output it to the second processor 40.

At this time, according to a control of the controller 50, the first processor 30 may output only the first image signal or only the OSD menu signal, or the prescribed first signal obtained by synthesizing the processed first image signal and the OSD menu signal.

Here, in general, the first image signal comprises at least one of a broadcast signal received by an antenna (not shown), an image signal received from a video player or DVD player, a composite video baseband (CVBS) signal, an S-video signal, a standard definition (SD) image signal or a high definition (HD) image signal. According to a type of signal received, such first image signal is processed into the image signal suited for displaying the image through an A/D converting process, a decoding process, a broadcast signal processing process using the image processing unit 35. That is, such first image signal is the signal with a standard resolution which can be processed through the first processor 30.

The second processor 40 is the function unit for processing the second image signal having the high resolution (for example, WUXGA(1920*1200)) which is not processed in the first processor 30. For example, the second image signal is PC image signal. In general, the PC image signal differs from the first image signal in a frequency band and a resolution, and so an additional processor is used for processing this signal, and the second processor 40 is provided for processing this signal. That is, the second processor 40 receives the PC image signal which is the typical second image signal having the high resolution and processes it into the type of image signal which can be displayed on the display unit 45 and, then outputs the processed signal. Also, the second processor 40 passes merely the image signal (at least one of the first image signal, the OSD menu signal and the first signal) outputted from the first processor 30 and can output it to the display unit 45. Further, the second processor may perform an additional process (for example, panorama, letterbox, and so on) to process the image signal with a final format to be displayed. Here, since the image signal (one of the first image signal and the fist signal) outputted from the first processor 30 is the signal which is basically scaling-processed through the first scaler 34, although the image signal is merely passed through the second processor 40 and outputted to the display unit 45, the image signal is normally displayed.

Here, the second processor 40 comprises a V port 44 which is an input port to which the image signal (at least one of the first image signal, the OSD menu signal and the first signal) outputted from the first processor 30 is inputted and an analog/digital convert (ADC) port 42 which is an input port to which the PC image signal having the high resolution is inputted. Here, the ADC port 42 refers to the port which converts the inputted analog PC image signal into a digital PC image signal. In addition to the V port 44 and the ADC port 42, the second processor 40 may further comprise ports (not shown) to which various other kinds of image signals can be received.

It is preferable that the above second processor 40 is a scaler which has not only the scaling-process function for the PC image signal and the image signal (at least one of the first image signal, the OSD menu signal and the first signal) outputted from the first processor 30, but also has various process functions such as a picture-in-picture (PIP) function, an interlaced progressive converting (IPC) function, a panorama function, and so on.

Hence, once displaying of the first image signal is selected by a control of the controller 50, the second processor 40 processes the image signal received from the first processor 30 to output it to the display unit 45. Also, once a display of the second image signal having the high resolution (PC image signal), which is not processed by the first processor 30, is selected by a control of the controller 50, the second processor 40 does not process the image signal received from the first processor 30 and processes the PC image signal inputted through the ADC port 42 to output it to the display unit 45.

At this time, once the second processor 40 receives the input signal on a generation of the OSD menu from the controller 50 during the second processor 40 processes the PC image signal and outputs the processed signal to the display unit 45, the second processor 40 PIP-processes the OSD menu signal and the PC image signal received from the first processor 30 through the V port 44 and outputs the OSD menu signal as a sub screen and the PC image signal as a main screen to the display unit 45.

Here, it is desirable to store the information regarding a display location and a display dimension corresponding to the kind of OSD menu screen in the second processor 40 in advance. It is preferable that the information regarding a display location and a display dimension corresponding to the kind of OSD menu is the same as a display location and a display size dimension of the corresponding OSD menu screen in the screen displayed by the first signal which is obtained by synthesizing the first image signal and the OSD menu signal in the first processor 30 and is outputted. Hence, under the control of the controller 50 according to an adjustment of the OSD menu function, the second processor 40 adjusts and PIP-processes the OSD menu signal received from the first processor 30 according to the display location and the display dimension which are previously stored and corresponds to the kind of OSD menu screen.

In the case that the displaying of the first image signal is selected according to an input of the signal source selection key (not shown), the controller 50 controls the image processing unit 35 of the first processor 30 and the second processor 40 to process/output the first image signal and to display the processed image signal on the display unit 45. At this time, once the controller 50 receives the input through the OSD menu key, the controller 50 controls the OSD generation unit 36 to generate the OSD menu signal, synthesize the OSD menu signal and the first image signal and controls the first processor 30 and the second processor 40 to display the synthesized signal on the display unit 45.

Also, in the case that the display of the second image is selected according to an input of the signal source selection key (not shown), the controller 50 controls the second processor 40 to process/output the second image signal and to display the processed image signal on the display unit 45. Hence, the second processor 40 does not process the image signal received from the first processor 30 and processes the second image signal (PC image signal) inputted through the ADC port 42, to output it to the display unit 45.

At this time, once the controller 50 receives the input through the OSD menu key, the controller 50 disables the image processing unit 35 processing the first image signal, controls the first processor 30 to generate the OSD menu signal and outputs the input signal for a generation of the OSD menu to the second processor 40. Hence, the first processor 30 does not process the first image signal and outputs only the OSD menu signal generated in the OSD generation unit 36 through the mixer 38. The second processor 40 receiving the input signal for a generation of the OSD menu PIP-processes the OSD menu signal received from the first processor 30 through the V port 44 and outputs the OSD menu signal as a sub screen and the PC image signal as a main screen to the display unit 45.

Hence, when the second processor 40 processes the image signal which has the high resolution and is not processed in the first processor 30 including the OSD generation unit 36 and displays the processed signal, the display apparatus according to an exemplary embodiment of the present invention can PIP-process the OSD menu signal generated in the first processor 30 when the OSD menu function is performed and display the processed signal. When the image with the high resolution is displayed, accordingly, the display apparatus according to an exemplary embodiment of the present invention uses the OSD menu signal outputted from the first processor 30 without the structure requiring an additional independent chip (not shown) used for only the OSD in addition to the OSD generation unit 36 of the first processor 30, and so it is possible to solve the shortcoming that an additional cost for adding the private chip (not shown) for the OSD is required.

Once the OSD menu is adjusted according to a key input through the user input unit 60, the controller 50 outputs a signal regarding a kind of the OSD menu screen selected by the adjustment to the second processor 40. Accordingly, the second processor 40 adjusts and PIP-processes the OSD menu signal received from the first processor 30 to display the OSD menu screen of the OSD menu signal in the corresponding display location and display dimension previously stored according to the signal regarding the kind of the OSD menu screen.

Here, when the image signal having a high resolution is processed in the second processor 40 and displayed, the display apparatus according to an exemplary embodiment of the present invention can provide an OSD menu screen having the display location and the display dimension which are same as those of the OSD menu screen displayed by the first signal obtained by synthesizing the first image signal and the OSD menu signal and outputted from the first processor 30. Accordingly, the display apparatus according to an exemplary embodiment of the present invention can improve the problem that there is no unity of the screens due to a difference between the OSD menu screens obtained when the image with standard resolution and the image with high resolution are displayed and an appearance difference is generated by a variation of resolution and definition of image according to a performance of the processor.

Figure 1:
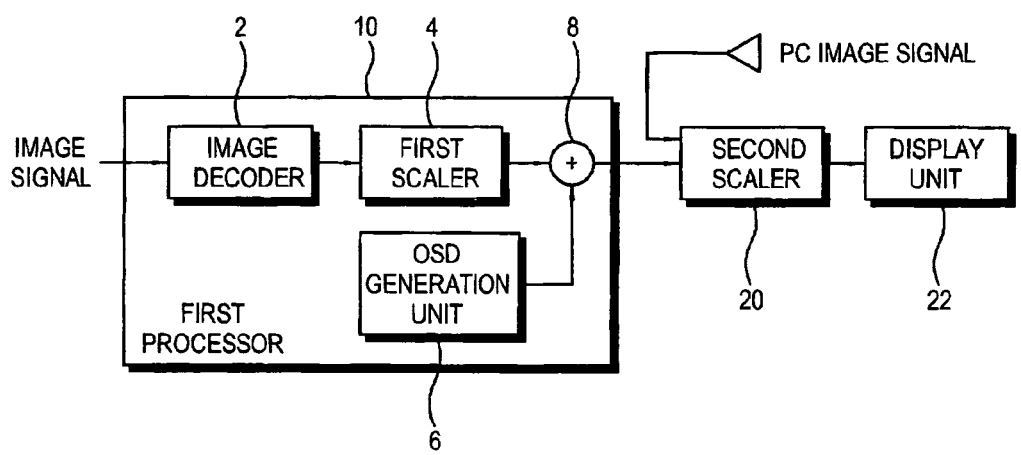
FIG. 1 is a control block diagram of a conventional display apparatus.

Here, although the structure in which the controller 50 is provided in addition to the first processor 30 is illustrated in FIG. 1 as one example, this structure is merely one of various possible embodiments. According to a recent trend of image processing systems, it is possible to provide the controller 50 in the first processor 30.

Figure 3:
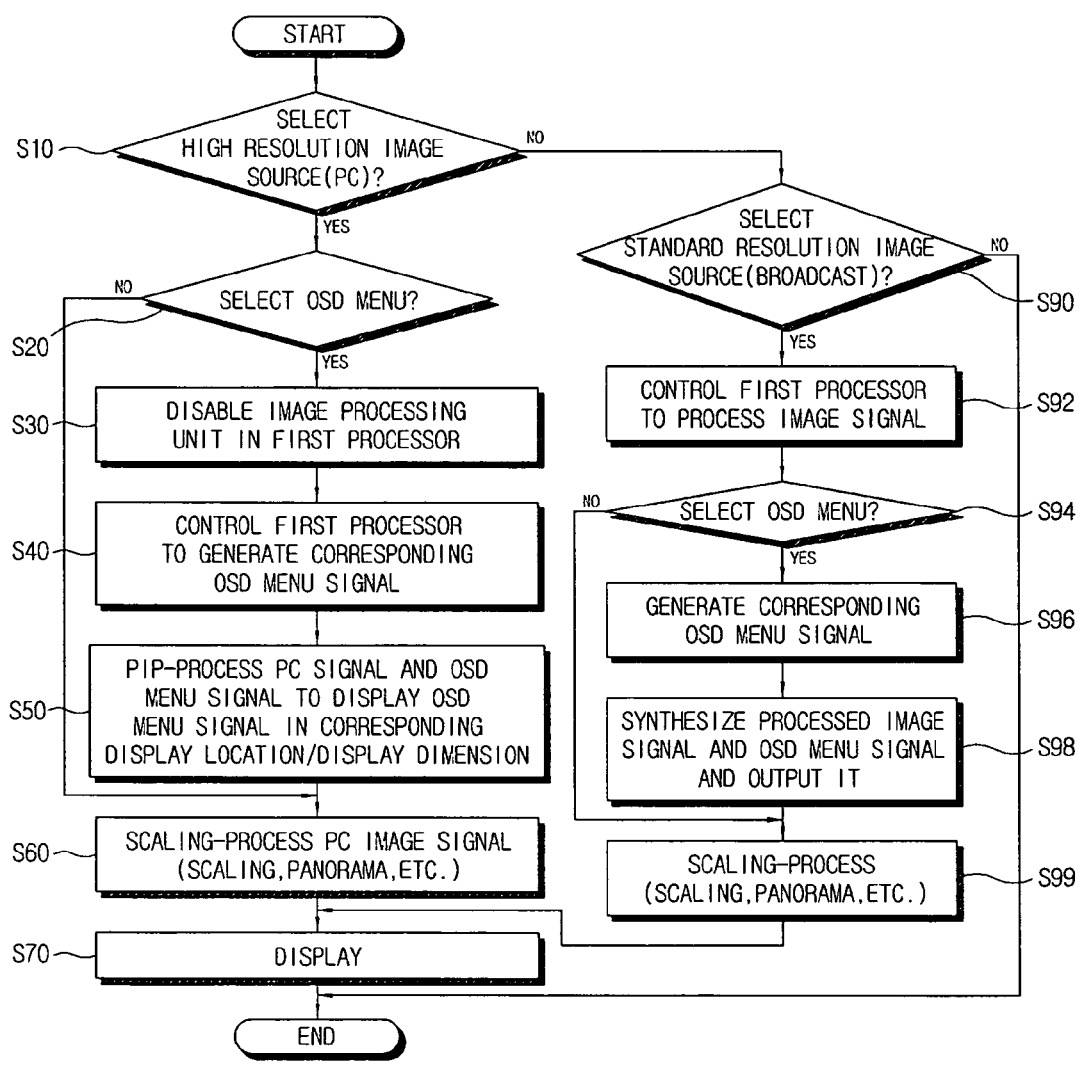
FIG. 3 is a flow chart illustrating a method for controlling the display apparatus according to an exemplary embodiment of the present invention.

Here, a method for controlling the display apparatus of the present invention is described with reference to FIG. 3 as follows.

First, according to an input of the signal source selection key (not shown) of the user input unit 60, the controller 50 decides whether a high resolution image source (for example, PC) is selected for displaying the second image signal having the high resolution or not at operation S10. If the high resolution image source is not selected, the controller 50 decides whether an image source (for example, broadcasting) is selected for displaying the first image signal having standard resolution or not at operation S90. If the standard resolution image source (broadcasting) is selected, the controller 50 controls the image processing unit 35 of the first processor 30 for processing the first image signal (broadcast signal) at operation S92. Otherwise the method ends. Here, the controller 50 decides whether the OSD menu signal is inputted through the OSD selection key (not shown) of the user input unit 60 to select the OSD menu function or not at operation S94. If the OSD menu function is not selected, the controller 50 controls the second processor 40 for scaling or passing the image signal (broadcast signal) processed in the image processing unit 35 and outputted through the mixer 38 and then outputting the above signal to the display unit 45 at operation S99. Accordingly, the image obtained by the image signal (broadcast signal) processed in the image processing unit 35 is displayed at operation S70. However, if the controller 50 decides that the OSD menu function is selected in the operation S94, the controller 50 controls the OSD generation unit 36 of the first processor 30 for generating the OSD menu signal corresponding to the OSD menu selected through the user input unit 60 at operation S96. Hence, the mixer 38 in the first processor 30 outputs the first signal obtained by synthesizing the image signal (broadcast signal) outputted from the image processing unit 35 and the OSD menu signal outputted form the OSD generation unit 36 at operation S98. The controller 50 controls the second processor 40 for scaling or passing the first image signal outputted from the first processor 30 and then outputting the above signal to the display unit 45 at operation S99. Therefore, the image obtained by the first image signal (broadcast signal+OSD menu signal) outputted from the first processor 30 is displayed at operation S70.

Here, if the controller 50 judges that a high resolution image source (for example, PC) is selected in the operation S10, the controller 50 decides whether the OSD menu function is selected by an input through the OSD selection key (not shown) of the user input unit 60 or not at operation S20. If the OSD menu function is not selected, the controller 50 does not process the image signal received from the first processor 30 and controls the second processor 40 for scaling-processing the second image signal having high resolution (PC image signal) received from the high resolution image source (for example, PC) to output the processed signal to the display unit 45 at operation S60. At this time, the second processor 40 has not only the scaling-process function for the inputted PC image signal having high resolution, but also has the various process functions such as the picture-in-picture (PIP) function, the interlace to progressive converting (IPC) function, the panorama function and the like, and so the second processor 40 can process the image signal with a final format to be displayed. Therefore, the image according to the PC image signal with the high resolution received from the high resolution image source (for example, PC) is displayed at operation S70.

Here, once the controller judges that the OSD menu function is selected in operation S20, the controller 50 controls the first processor 30 to disable image processing at operation S30. Also, the controller 50 controls the OSD generation unit 36 in the first processor 30 for generating the OSD menu signal corresponding to the OSD menu selected through the user input unit 60 at operation S40. Accordingly, by means of a control of the controller 50, the second processor 40 PIP-processes the second image signal (PC image signal) having high resolution received from the high resolution image source (for example; PC) and the OSD menu signal received from the first processor 30 at operation S50. At this time, the second processor 40 PIP-processes the OSD menu signal received from the first processor 30 in the display location and display dimension of the OSD menu screen corresponding to the signal regarding the kind of OSD menu screen received from the controller 50 according to the kind of the selected OSD menu. Hereafter, the second processor 40 scaling-processes the second image signal (PC image signal) and the image signal obtained by PIP-processing the OSD menu signal and outputs the processed signal to the display unit 45 according to the control of the controllers 50 at operation S60. Accordingly, the PC image with high resolution including the OSD menu screen is displayed at operation S70.

In the method for controlling the display apparatus according to an exemplary embodiment of the present invention, when an image having high resolution is displayed, the OSD menu signal outputted from the OSD generation unit 36 in the first processor 30 is used, and so although the process embodied for displaying the image with standard resolution differs from that embodied for displaying the image with high resolution, harmonized OSD menu screens can be provided.

According to exemplary embodiments of the present invention as described above, the display apparatus and the method for controlling the same which can display the harmonized OSD menu image without an additional cost can be provided.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
   a display unit;
   a first processor for outputting a first signal including an on-screen-display (OSD) menu signal and a first image signal;
   a second processor having a picture-in-picture (PIP) function, the second processor processing one of a second image signal and the first signal and outputting the processed signal to the display unit; and
   a control unit for controlling the first processor for interrupting an output of the first image signal and outputting the OSD menu signal and for controlling the second processor for PIP processing to output the OSD menu signal as a sub screen and the second image signal as a main screen in the case that an OSD menu function is selected when the display unit displays an image according to the second image signal.

2. The display apparatus according to claim 1, wherein the second processor comprises a scaler having the PEP function and receiving the second image signal and the first signal, and the scaler processes one of the second image signal and the first signal with a format to be displayed on the display unit.

3. The display apparatus according to claim 2, wherein the first image signal is one of a composite video baseband signal (CVBS) which is an image signal having a standard resolution, a broadcast signal and an S video signal, and the second image signal is a PC signal which is an image signal having a high resolution not to be processed in the first processor.

4. The display apparatus according to claim 3, wherein the first processor comprises an image processing unit for processing the first image signal received from an external source, an OSD generation unit for generating the OSD menu signal and a mixer for synthesizing the first image signal processed in the image processing unit and the OSD menu signal generated in the OSD generation unit to output the synthesized signal.

5. The display apparatus according to claim 4, wherein the control unit disables the image processing unit and controls the OSD generation unit for outputting the OSD menu signal and controls the second processor for PIP processing the OSD menu signal outputted through the mixer into the sub screen and the second image signal into main screen if a prescribed OSD menu function is selected when the image is displayed on the display unit according to the second image signal.

6. The display apparatus according to claim 5, further comprising a user input unit for selecting the OSD menu function and adjusting the OSD menu function, and
   wherein the control unit controls the second processor for displaying the image on the display unit according to the second image signal when displaying the image according to the second image signal is selected through the user input unit and disables the image processing unit and controls the OSD generation unit for outputting the OSD menu signal when the OSD menu function is selected through the user input unit.

7. The display apparatus according to claim 6, wherein the control unit controls the image processing unit and the second processor for displaying the image on the display unit according to the first image signal when displaying the image according to the first image signal is selected through the user input unit and controls the OSD generation unit for outputting the OSD menu signal when the OSD menu function is selected through the user input unit.

8. The display apparatus according to claim 7, wherein the control unit outputs the signal regarding the kind of the OSD menu screen selected according an adjustment to the second processor when the OSD menu function is adjusted through the user input unit.

9. The display apparatus according to claim 8, wherein the second processor stores information on a display location and a display dimension corresponding to the kind of the OSD menu screen in advance, and adjusts and PIP-processes the display location and the display dimension of the OSD menu screen according to the OSD menu signal received from the first processor in response to the signal regarding the kind of the OSD menu screen provided from the control unit.

10. The display apparatus according to claim 9, wherein the second processor comprises an image port to which the first signal is inputted and an input port to which the second image signal is inputted.

11. A method for controlling a display apparatus comprising a display unit, a first processor for outputting a first signal including an on-screen-display (OSD) menu signal and a first image signal and a second processor having a picture-in-picture (PIP) function, processing one of a second image signal and the first signal and outputting the processed signal to the display unit, comprising the steps of:
  displaying an image on the display unit according to the second image signal if displaying the image according to the second image signal is selected;
  deciding whether a prescribed OSD menu function is selected when the image is displayed according to the second image signal;
  interrupting an output of the first image signal and outputting the OSD menu signal by controlling the first processor if the OSD menu function is selected; and
  PIP-processing and outputting the outputted OSD menu signal as a sub screen and the second image signal as a main screen.

12. The method for controlling the display apparatus according to claim 11, wherein the second processor is a scaler having the PIP function that receiving the second image signal and the first signal, wherein the scaler processes one of the second image signal and the first signal with a format to be displayed on the display unit.

13. The method for controlling the display apparatus according to claim 12, wherein the first image signal is one of a composite video baseband signal (CVBS) which is an image signal having standard resolution, a broadcast signal and an S video signal, and the second image signal is a PC signal which is an image signal having a high resolution that is not processed in the first processor.

14. The method for controlling the display apparatus according to claim 13, wherein the first processor comprises an image processing unit for processing the first image signal received from an external source, an OSD generation unit for generating an OSD menu signal and a mixer for synthesizing the first image signal processed in the image processing unit and the OSD menu signal generated in the OSD generation unit to output the synthesized signal; wherein the method further comprises disabling the image processing unit to interrupt an output of the first image signal, and controlling the OSD generation unit to output the OSD menu signal, if the OSD menu function is selected.

15. The method for controlling the display apparatus according to claim 14, further comprising storing information on a display location and a display dimension corresponding to the kind of the OSD menu screen in the second processor in advance, and
  wherein in the PIP-processing and outputting step, the second processor adjusts and PIP-processes the display location and the display dimension of the OSD menu signal according to the kind of the OSD menu screen in response to the OSD menu signal outputted from the first processor.

* * * * *